(12) United States Patent
Kim et al.

(10) Patent No.: US 10,167,817 B1
(45) Date of Patent: Jan. 1, 2019

(54) COMPRESSED NATURAL GAS INJECTOR

(71) Applicant: DONGBANGTECH CO., LTD, Busanjin-gu, Busan (KR)

(72) Inventors: Dong Jo Kim, Busan (TW); Jong Wan Lim, Gyeongsangnam-do (KR)

(73) Assignee: DONGBANGTECH CO., LTD., Busan (KR)

( * ) Notice: Subject to any disclaimer, the term of this patent is extended or adjusted under 35 U.S.C. 154(b) by 0 days.

(21) Appl. No.: 15/822,006

(22) Filed: Nov. 24, 2017

(51) Int. Cl.
*F02M 21/02* (2006.01)

(52) U.S. Cl.
CPC .... *F02M 21/0254* (2013.01); *F02M 21/0215* (2013.01); *F02M 21/0263* (2013.01)

(58) Field of Classification Search
CPC ........... F02M 21/0254; F02M 21/0215; F02M 21/0263; F02M 51/061
USPC ........... 123/525, 490; 239/585.1; 251/129.15
See application file for complete search history.

(56) References Cited

U.S. PATENT DOCUMENTS 6,328,231 B1 * 12/2001 Ording ............... F02M 51/0625
239/585.1

FOREIGN PATENT DOCUMENTS

| JP | 2010-38110 | * | 2/2010 | ......... F02M 21/0254 |
| JP | 2012-82726 | * | 4/2012 | ......... F02M 21/0254 |
| WO | WO2010/016343 | * | 2/2010 | ......... F02M 21/0254 |

* cited by examiner

*Primary Examiner* — Hai Huynh
(74) *Attorney, Agent, or Firm* — Muncy, Geissler, Olds & Lowe, P.C.

(57) ABSTRACT

Disclosed is a compressed natural gas injector. The injector includes: a housing provided at a fuel supply pipe of an engine; a needle valve provided at a lower portion of the housing, and having an injection nozzle; a solenoid having a coil provided in the housing and generating a magnetomotive force by receiving power, and a core generating an attraction force due to the magnetomotive force; a reciprocating plunger provided below the solenoid; and an elastic member placed on the plunger and including a contact portion provided in parallel to a lower surface of the core, and a protruding portion inclinedly protruding upwards and outwards from the contact portion.

2 Claims, 3 Drawing Sheets

(Prior Art)

COMPRESSED NATURAL GAS INJECTOR

BACKGROUND OF THE INVENTION

Field of the Invention

The present invention relates generally to a compressed natural gas injector. More particularly, the present invention relates to a compressed natural gas injector, the injector being capable of realizing improved operation performance between a solenoid and a plunger of an injector for a vehicle using gas fuel, and reducing impact and noise therebetween.

Description of the Related Art

Recently, vehicles using gas such as liquefied petroleum gas (LPG), liquefied natural gas (LNG), natural compressed gas (CNG), etc. as fuel have been widely used in consideration of economical efficiency and environmental friendliness. Compressed natural gas (CNG) is less expensive than gasoline, and is in a gaseous state so that fuel distribution to each cylinder is uniform. In addition, exhaust gas is less polluted compared to gasoline, which is advantageous in terms of environment.

Further, when compressed natural gas is used as a vehicle fuel, minimal knocking occurs because the octane rating thereof is high. In addition, loss of lubricating oil is small, and engine warm-up is fast. As such, compressed natural gas, which has relatively many advantages over gasoline, is widely used as fuel for a commercial vehicle including a taxi and a bus.

This gas vehicle is configured to atomize and inject the gaseous fuel into the cylinder of the engine, and an injector is used for this purpose. The injector is usually controlled by an electronic control unit (ECU) mounted in the vehicle. The electronic control unit (ECU) controls the injection timing of the injector based on the position of the accelerator pedal under various external conditions.

FIG. 1 is a schematic view schematically showing a sectional configuration of a conventional injector 10. As shown in FIG. 1, the conventional injector includes a solenoid coil 13 and a plunger 14 such that the plunger 14 is lifted by a magnetic force generated when electric power is applied to the solenoid coil 13 by the ECU. Then, the injector is separated from a nipple 16 whereby the fuel introduced into the inlet 11 is injected through an injection hole 17.

On the other hand, the plunger of the conventional injector is actuated in the direction of being attracted to the core by the magnetic force generated when an electromotive force is applied to the solenoid. An elastic member is provided to prevent the impact from occurring between the core and the plunger due to the reciprocating movement of the plunger. However, contact surfaces of the elastic member at which the elastic member is in contact with the plunger and the core are parallel to each other. Accordingly, there is a problem in that the reciprocating movement of the plunger may not be efficiently performed due to the magnetic force (residual magnetic force) that remains in the plunger.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention provides a compressed natural gas injector, in which an elastic member provided on the upper portion of a plunger is structured such that even when a magnetic force remains in the plunger, the elastic member provides an elastic force in the direction in which a core and the plunger are distanced away from each other, whereby the plunger is efficiently operated, thereby preventing combustion delay.

In order to achieve the above object, according to one aspect of the present invention, there is provided a compressed natural gas injector, the injector includes: a housing provided at a fuel supply pipe of an engine; a needle valve provided at a lower portion of the housing, and having an injection nozzle; a solenoid having a coil provided in the housing and generating a magnetomotive force by receiving power, and a core generating an attraction force due to the magnetomotive force; a reciprocating plunger provided at a lower portion of the solenoid; and an elastic member placed on the reciprocating plunger and including a contact portion provided in parallel to a lower surface of the core, and a protruding portion inclinedly protruding upwards and outwards from the contact portion.

A plurality of protruding portions may protrude from an upper surface of the contact portion such that the plurality of protruding portions are arranged spaced apart from each other by a predetermined interval while facing each other in pairs.

According to the compressed natural gas injector of the present invention, the contact portion is provided between the plunger and the core in parallel therewith, and the protruding portion inclinedly protrudes upwards and outwards from the upper surface of the contact portion, whereby even when a magnetic force remains in the plunger, the plunger can be quickly distanced from the core, thereby preventing occurrence of misfire or combustion delay.

Further, as required, the plurality of protruding portions protrudes from the upper surface of the contact portion such that the plurality of protruding portions are arranged spaced apart from each other by a predetermined interval. Accordingly, the elastic force can be adjusted by adjusting the number of the protruding portions.

In addition, since the protruding portion protrudes from the upper portion of the elastic member, when the solenoid and the plunger come into close contact with each other, the solenoid and the plunger can be distanced from each other by the elastic force of the protruding portion. Accordingly, a flow passage is secured in a space where a return spring of the conventional injector is provided, so gas fuel can be injected efficiently.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings.

The accompanying drawings are only examples shown in order to describe the technical idea of the present invention in more detail. Therefore, the technical idea of the present invention is not limited to shapes of the accompanying drawings.

In the following description, it is to be noted that, when the functions of conventional elements and the detailed description of elements related to the present invention may make the gist of the present invention unclear, a detailed description of those elements will be omitted.

Figure 1:
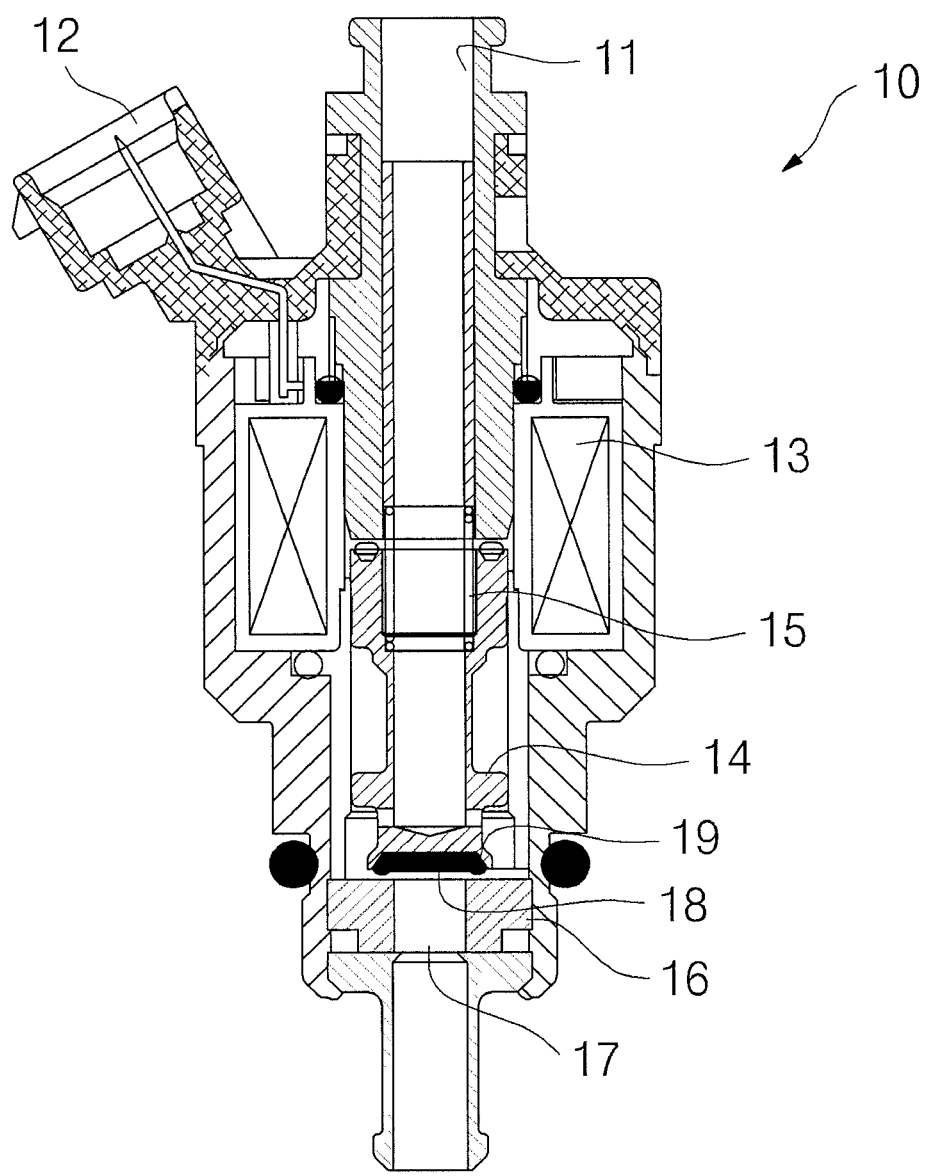
FIG. 1 is a schematic view schematically showing a sectional configuration of a conventional injector.
Figure 2:
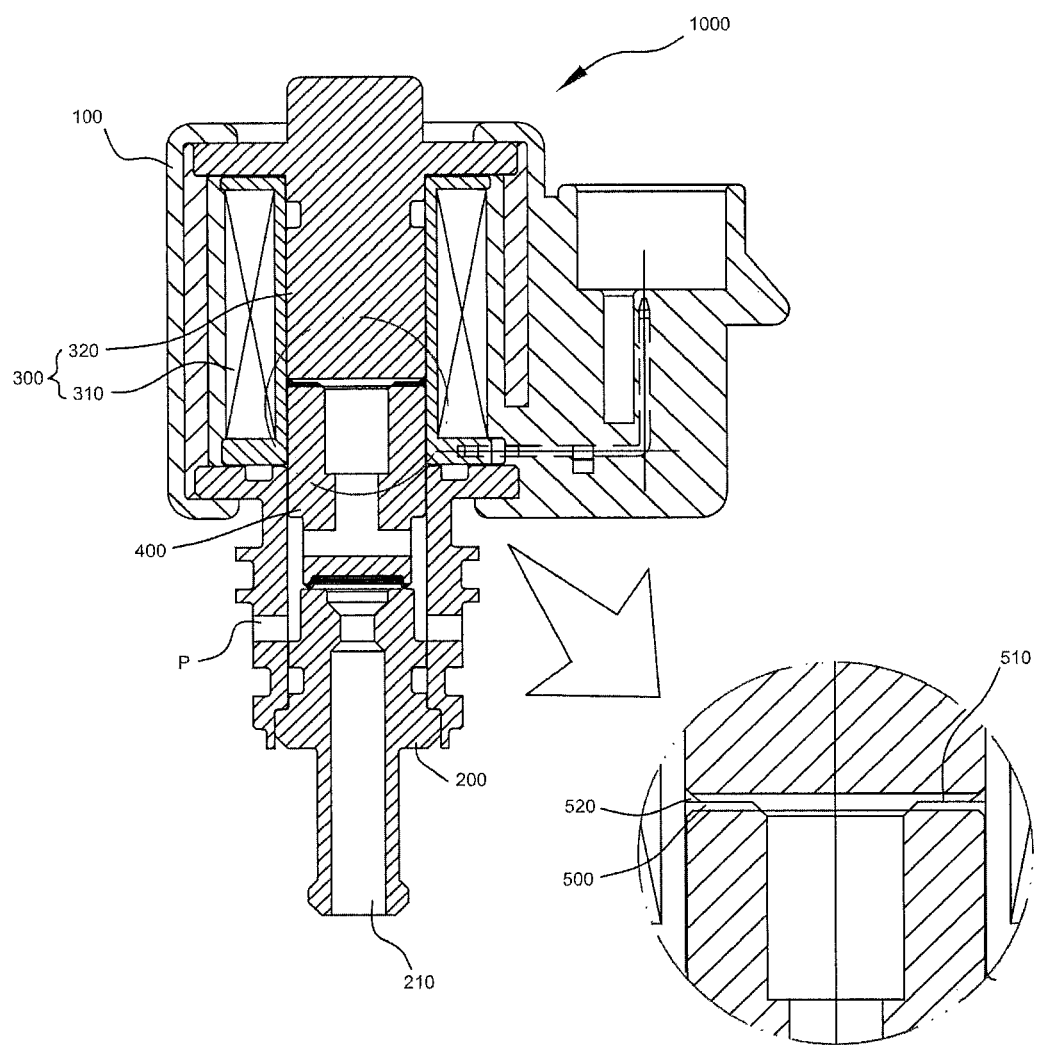
FIG. 2 is a cross-sectional view showing a compressed natural gas injector according to an embodiment of the present invention.

FIG. 2 is a cross-sectional view showing a compressed natural gas injector according to an embodiment of the present invention.

As shown in FIG. 2, the compressed natural gas injector 1000 according to the present invention includes a housing 100, a needle valve 200, a solenoid 300, a reciprocating plunger 400, and an elastic member 500.

First, the housing 100 is provided at the fuel supply pipe of the engine. The housing 100 includes therein the solenoid 300, the plunger 400 reciprocating by the solenoid 300, and the elastic member 500 provided between the solenoid 300 and the plunger 400.

Next, the needle valve 200 is provided at a lower portion of the housing 100, and an injection nozzle 210 injecting gas fuel into the combustion chamber is provided to pass through the interior of the needle valve 200. The needle valve 200 supports at an upper portion thereof a lower surface of the plunger 400, and when the plunger 400 reciprocates, the plunger 400 and the needle valve 200 are distanced from each other whereby fuel is injected into the combustion chamber through the injection nozzle 210.

The solenoid 300 is provided in the housing 100, and includes a coil 310 generating a magnetomotive force by receiving power, and a core 320 generating an attraction force due to the magnetomotive force.

Herein, the solenoid 300 receives an operation signal and current from an ECU (not shown) together to generate the magnetomotive force. The core 320 having a cylindrical shape is provided in the housing 100, and the coil 310 is provided on an outer circumferential surface of the core 320.

Further, the plunger 400 is provided below the solenoid 300, and is actuated in a direction of being attracted to the core 320 by a magnetic force generated when an electromotive force is applied to the coil 310.

Figure 3:
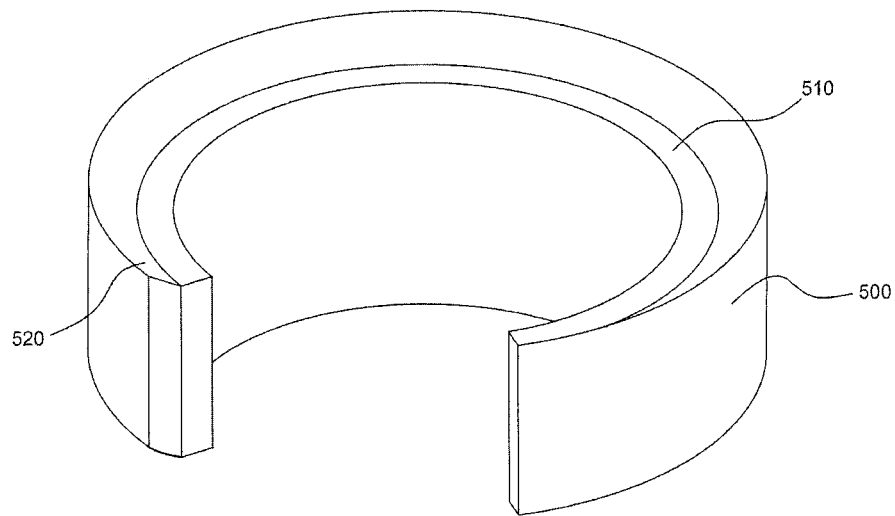
FIG. 3 is a perspective view showing an elastic member according to an embodiment of the present invention.

FIG. 3 is a perspective view showing the elastic member according to an embodiment of the present invention.

As shown in FIG. 3, the elastic member 500, which is the most important feature of the present invention, is placed on the plunger 400 and includes a contact portion 510 provided in parallel to a lower surface of the core 320, and a protruding portion 520 inclinedly protruding upwards and outwards from the contact portion 510.

The elastic member 500 may be made of an elastic synthetic resin or a resin material.

A lower portion of the elastic member 500 is placed on an upper surface of the plunger 400, and an upper portion of the elastic member 500 is provided with the contact portion 510 whereby the impact is cushioned when the plunger 400 is moved toward the solenoid 300. The protruding portion 520 protrudes upwards and outwards from the contact portion 510 whereby an elastic force is provided between the plunger 400 and the solenoid 300.

In other words, when the current flows in the solenoid 300, the solenoid 300 is magnetized and attracts the plunger 400, whereas when the current flowing in the solenoid 300 is shut off, the plunger 400 is not magnetized so that the plunger 400 is released. Accordingly, when the plunger 400 is moved upward or downward, the opening/closing operation of the needle valve 200 during fuel injection is controlled.

Further, return springs (not shown) are provided in the core 320 of the solenoid 300 and the plunger 400, respectively such that the springs are organically connected to each other. Accordingly, the attraction action to the plunger 400 can be elastically performed.

As described above, when the current flows in the solenoid 300, the solenoid 300 is magnetized and attracts the plunger 400, whereas when the current flowing in the solenoid 300 is shut off, the solenoid 300 is not magnetized so that the plunger 400 is released to be distanced from the solenoid 300. However, a magnetic force (residual magnetic force), which remains after the plunger 400 is attracted to the solenoid 300, exists in the plunger 400, so that the attraction force remains.

Thus, the lower portion of the elastic member 500 is in entire contact with an upper portion of the plunger 400, and the upper portion of the elastic member 500 is brought into partial contact with a lower surface of the solenoid 300 at the protruding portion 520 inclinedly protruding upwards and outwards from the contact portion 510, whereby the plunger 400 can be quickly distanced from the solenoid 300.

In other words, since the elastic member 500 provided with the contact portion 510 and the protruding portion 520 is provided between the solenoid 300 and the plunger 400, it is possible to cushion the impact and noise attributable to the upward movement of the plunger 400, and to improve airtightness performance. In addition, the plunger 400 and the solenoid 300 can be quickly distanced from each other, thereby preventing malfunction of the injector.

In addition, the conventional injector is configured such that a spring is provided between the solenoid 300 and the plunger 400 such that the solenoid 300 and the plunger 400 are distanced from each other. However, in the compressed natural gas injector 1000 according to the present invention, since the elastic member 500 is provided between the solenoid 300 and the plunger 400, the plunger 400 can reciprocate without provision of the spring. As a result, a flow passage is sufficiently secured whereby it is possible to efficiently inject gas fuel into the cylinder.

It is to be understood that the present invention is applicable to the above-described embodiments, and is also applicable to the following various embodiments.

Figure 4:
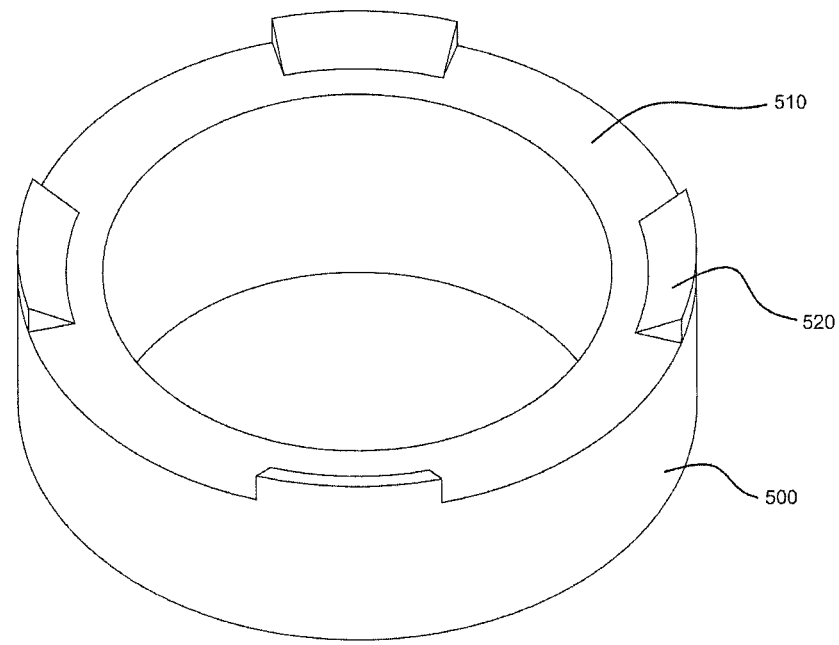
FIG. 4 is a perspective view showing an elastic member according to another embodiment of the present invention.

FIG. 4 is a perspective view showing an elastic member according to another embodiment of the present invention.

As shown in FIG. 4, a plurality of protruding portions 520 protrudes from an upper surface of the contact portion 510 such that the protruding portions 520 are arranged spaced apart from each other by a predetermined interval while facing each other in pairs.

The protruding portions 520 provided to face each other with respect to the center of the elastic member 500 may be provided on the upper surface of the contact portion 510 as a pair or a plurality of pairs. The size and number of the protruding portions 520 are not limited, and the elastic force exerting between the solenoid 300 and the plunger 400 can be adjusted by the size and number of the protruding portions 520 provided on the upper surface of the contact portion 510.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A compressed natural gas injector, the compressed natural gas injector comprising:
    a housing provided at a fuel supply pipe of an engine;
    a needle valve provided at a lower portion of the housing, and having an injection nozzle;
    a solenoid having a coil provided in the housing and generating a magnetomotive force by receiving power, and a core generating an attraction force due to the magnetomotive force;
    a reciprocating plunger provided below the solenoid; and
    an elastic member placed on the reciprocating plunger and including a contact portion provided in parallel to a lower surface of the core, and a protruding portion inclinedly protruding upwards and outwards from the contact portion.

2. The compressed natural gas injector of claim 1, wherein a plurality of protruding portions protrudes from an upper surface of the contact portion such that the plurality of protruding portions are arranged spaced apart from each other by a predetermined interval while facing each other in pairs.

\* \* \* \* \*